United States Patent [19]

Sawada et al.

[11] Patent Number: 4,913,809

[45] Date of Patent: Apr. 3, 1990

[54] CONCENTRATING APPARATUS WITH REVERSE OSMOSIS MEMBRANE

[75] Inventors: Iwao Sawada; Masaaki Imai, both of Nishinomiya; Hayato Fujii, Osaka, all of Japan

[73] Assignees: Sasakura Engineering Co., Ltd.; Taiyo, Ltd., Osaka, both of Japan

[21] Appl. No.: 366,640

[22] Filed: Jun. 15, 1989

[30] Foreign Application Priority Data

Jun. 29, 1988 [JP] Japan .................. 63-162004

[51] Int. Cl.$^4$ ............................................. B01D 13/00
[52] U.S. Cl. ..................................... 210/98; 210/117; 210/257.2; 210/321.65
[58] Field of Search ................. 210/649–654, 210/87–91, 98, 117, 136, 137, 257.2, 321.6, 321.65

[56] References Cited

U.S. PATENT DOCUMENTS 4,604,194  8/1986  Entingh ............................. 210/257.2
4,695,375  9/1987  Tyler .................................. 210/321.6

Primary Examiner—Frank Sever
Attorney, Agent, or Firm—Marshall, O'Toole, Gerstein, Murray & Bicknell

[57] ABSTRACT

This disclosure relates to apparatus comprising a reverse osmosis membrane module, a reciprocating pump and a double-acting hydraulic cylinder. The pump includes a piston defining on its opposite sides a first cylinder chamber and a second cylinder chamber which has a smaller cross-sectional area than the first chamber. The first chamber connects with a feed fluid supply conduit provided with a feed valve which opens when the first chamber expands. The membrane module includes an inlet and an outlet. The inlet connects with the first cylinder chamber when the first cylinder chamber contracts in volume, and the outlet connects with the second cylinder chamber through a selector connecting with a concentrate fluid drain conduit. The selector has a first position where the second chamber and the outlet are interconnected and the drain conduit is disconnected from the second chamber and the outlet, and a second position where the second chamber and the drain conduit are interconnected and the outlet is disconnected from the second chamber and the drain conduit. The hydraulic cylinder includes a piston coupled by a rod to the pump piston and defining two chambers on its opposite sides, which are supplied alternately with hydraulic pressure to reciprocate the pistons. The selector is coupled to an actuator connecting with the hydraulic cylinder. The actuator is responsive to the pressure in one of the hydraulic cylinder chambers to shift the selector to the first position immediately before the first cylinder chamber starts to contract, and to the pressure in the other hydraulic cylinder chamber to shift the selector to the second position immediately before the first chamber starts to expand.

6 Claims, 2 Drawing Sheets

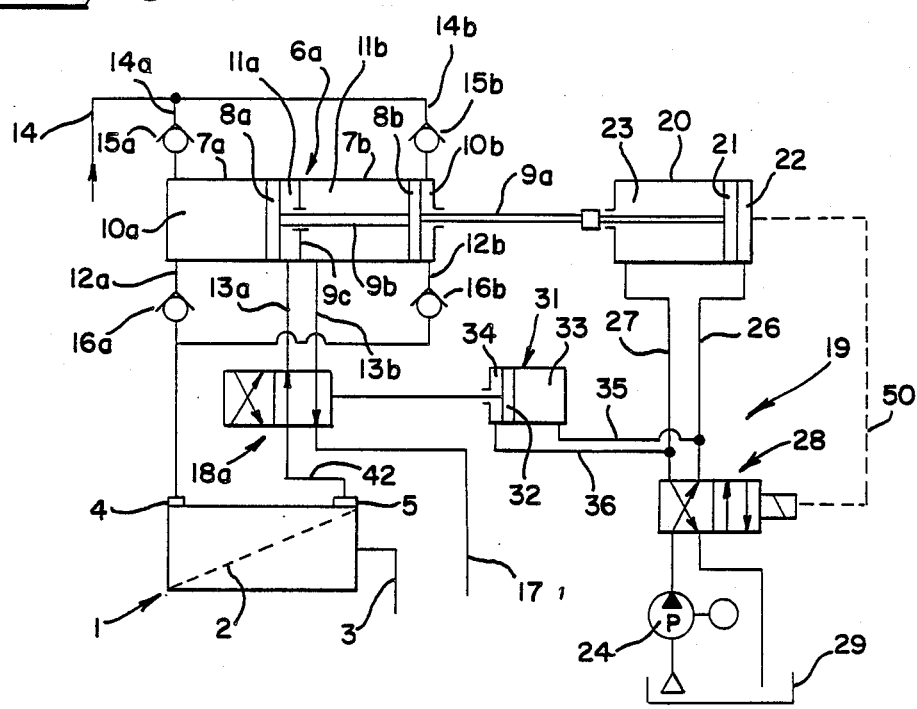
FIG-3-
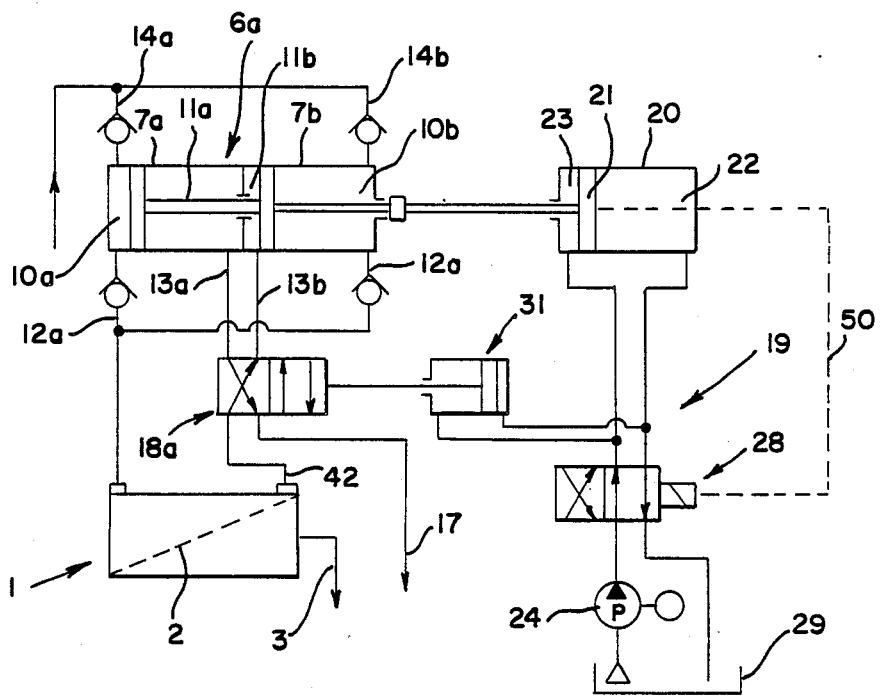
FIG-4-

CONCENTRATING APPARATUS WITH REVERSE OSMOSIS MEMBRANE

FIELD AND BACKGROUND OF THE INVENTION

The present invention relates to desalting/concentrating apparatus including a reverse osmosis membrane. The apparatus pressurizes feed fluid under high pressure and supplies it to the membrane, and the fluid is separated into a permeate fraction which permeates through the membrane and a concentrate fraction which does not permeate the membrane.

U.S. Pat. No. 4,432,876 to Keefer shows a prior art reverse osmosis apparatus. With particular reference to FIG. 2 of the patent, a reciprocating feed pump 60 includes a pumping chamber 26.2 and an expansion chamber 37.2 which contains a portion of piston rod 63 and is therefore smaller in cross-sectional area than the pumping chamber 26.2. The pumping chamber 26.2 connects through check valves 32.2 and 33.2 respectively with a feed fluid conduit 28.2 and a membrane pressure vessel 17 (FIG. 1). The expansion chamber 37.2 connects through directional valves 42.2 and 44.2 respectively with the membrane pressure vessel and an exhaust conduit.

A pumping stroke forces the feed fluid out of the pumping chamber 26.2 through the membrane pressure vessel into the expansion chamber 37.2 under high pressure because of the difference in volume between these chambers, thereby separating a permeate fluid fraction 13.2. An induction stroke sucks a feed fluid into the pumping chamber 26.2, and exhausts a concentrate fluid fraction 14.2.

The directional valves 42.2 and 44.2 are timed from a reciprocable drive 48 (FIG. 1) to open after initiation of a pumping or exhaust stroke respectively so that the valve actuation lags behind the piston stroke.

Upon initiation of a pumping or induction stroke, there is a sudden pressure rise respectively in the pumping or expansion chamber as the appropriate directional valve has not yet opened. This pressure rise is reduced by a volume exchange means 64 provided between the outfeed and return conduits 30.2 and 38.2.

The provision of volume exchanger 64 increases the cost and size of the apparatus. In addition, the exchanger 64 interrupts the pump operation for an instant at each end of the pump strokes, thus reducing the concentration capacity.

Japanese Patent Appln. 62-99271 filed on Apr. 22, 1987 (Provisional Pub. 63-264105 laid open on Nov. 1, 1988) and Appln. 62-311227 filed on Dec. 9, 1987 (both filed by Sasakura Engineering Co., Ltd.) show other reverse osmosis apparatus as prior art.

In Provisional Pub. 63-264105, the piston rod 9 of a reciprocating pump holds a nut 12 fixed thereto and engaging a screw shaft 11, which is rotated alternately in opposite directions by an electric motor 13 to reciprocate the piston 8.

In Appln. 62-311227 the reciprocating pump pistons 11 and 12 are fixed to a screw shaft 17 engaged with a nut 18, which is likewise rotated alternately by a motor 19.

In these apparatus, for the timing of a directional control valve to shift at each end of the piston strokes, the motor is required to temporally interrupt rotation at each end of the piston strokes, in order to shift the valve, or otherwise the pump is required to lower its reciprocating speed. This reduces the concentrating capacity. Also, the motor frequently repeats alternate rotation, and the wear between the screw and the nut is great, thereby lowering the durability of the apparatus.

It is an object of the present invention to provide a reverse osmosis apparatus, including a directional control valve which can be shifted accurately at each end of the pump piston strokes.

SUMMARY OF THE INVENTION

Apparatus according to this invention comprises a reverse osmosis membrane module, a reciprocating pump and a double-acting hydraulic cylinder. The pump includes a piston defining on its opposite sides a first cylinder chamber and a second cylinder chamber which has a smaller cross-sectional area than the first chamber. The first chamber connects with a feed fluid supply conduit provided with a feed valve which opens when the first chamber expands.

The membrane module includes an inlet and an outlet. The inlet connects with the first cylinder chamber through a check valve which opens when the first cylinder chamber contracts in volume. The outlet connects with the second cylinder chamber through a selector connecting with a concentrate fluid drain conduit. The selector has a first position where the second chamber and the outlet are interconnected and the drain conduit is disconnected from the second chamber and the outlet, and a second position where the second chamber and the drain conduit are interconnected and the outlet is disconnected from the second chamber and the drain conduit.

The hydraulic cylinder includes a piston coupled by a rod to the pump piston and defining two chambers on its opposite sides, which are supplied alternately with hydraulic pressure to reciprocate the pistons.

The selector is coupled to an actuator connecting with the hydraulic cylinder. The actuator is responsive to the pressure in one of the hydraulic cylinder chambers to shift the selector to the first position immediately before the first cylinder chamber starts to contract, and to the pressure in the other hydraulic chamber to shift the selector to the second position immediately before the first chamber starts to expand.

BRIEF DESCRIPTION OF THE DRAWINGS

The invention will be better understood from the following detailed description taken in conjunction with the figures of the accompanying drawings, wherein:

FIGS. 3 and 4 are diagrams similar to FIGS. 1 and 2 but showing second embodiment of the invention.

DETAILED DESCRIPTION OF THE INVENTION

Figure 1:
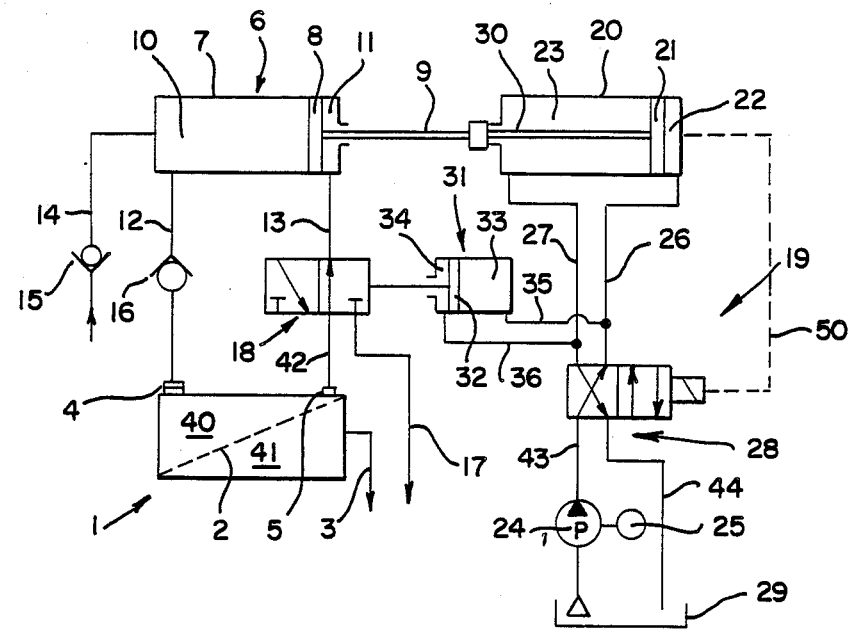
FIGS. 1 and 2 are diagrams illustrating a first embodiment of the invention in different stages of operation.
Figure 2:
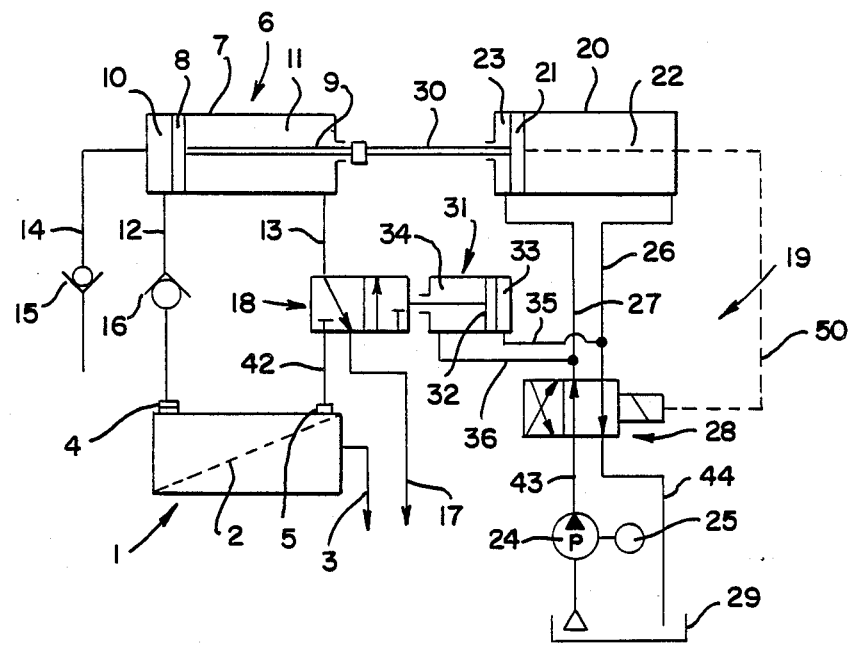

In FIGS. 1 and 2, a tank 1 contains a reverse osmosis membrane 2 separating it into two chambers 40 and 41. The first chamber 40 is provided with a feed fluid inlet 4 at one end and a concentrate fluid outlet 5 at its other end. The second chamber 41 is provided with a permeate fluid outlet pipe 3.

A reciprocating pump 6 includes a cylinder 7 containing a reciprocating piston 8 which is fixed to a rod 9 extending out of cylinder 7. The piston 8 defines two cylinder chambers 10 and 11 on its opposite sides. The first chamber 10 has a larger cross-sectional area than the second chamber 11 which contains a portion of piston rod 9. Thus, the maximum volume of first chamber 10 is larger than that of second chamber 11.

The first chamber 10 connects with the tank inlet 4 through a pipe 12 provided with a check valve 16 which opens toward the tank 1. The second chamber 11 connects through a pipe 13 with a directional control valve or selector 18 which connects through a pipe 42 with the tank outlet 5. This constitutes a circulating pipeline in a closed loop including the tank 1 and pump 6.

The selector 18 also connects with a concentrate fluid drain pipe 17. The selector 18 has a first position, shown in FIG. 1, where the second chamber 11 and tank outlet 5 are in communication and the drain pipe 17 is blocked, and a second position, shown in FIG. 2, where the second chamber 11 and the drain pipe 17 are in communication and the outlet 5 is blocked.

The first cylinder chamber 10 also connects with a feed fluid pipe 14 provided with a feed valve 15 in the form of a check valve which opens toward the first chamber 10.

A double-acting hydraulic cylinder system 19 includes a hydraulic cylinder 20, a directional control valve or selector 28, a hydraulic pump 24 and an oil tank or reservoir 29.

The double-acting hydraulic cylinder 20 contains a piston 21 fixed to a rod 30 which extends out of the cylinder 20 and is coupled to the pump piston rod 9. The piston 21 defines two cylinder chambers 22 and 23 on its opposite sides. These chambers 22 and 23 connect respectively through pipes 26 and 27 with the selector 28 which connects through a suction pipe 43 and a return pipe 44 with the tank 29. The pump 24 is connected in the suction pipe 43.

The hydraulic selector 28 has a first position, shown in FIG. 1, where the left cylinder chamber 23 and the return pipe 44 are interconnected and the right chamber 22 and the suction pipe 43 are interconnected, and a second position, shown in FIG. 2, where the left chamber 23 and the suction pipe 43 are interconnected and the right chamber 22 and the return pipe 44 are interconnected.

The hydraulic pump 24 is driven by an electric motor 25 rotating in one direction to suck oil from the tank 29 and deliver it to the pipe 43.

The hydraulic selector 28 can be controlled and actuated by means 50 to take the first position (FIG. 1) when the piston 21 has reached the right end of the cylinder 20, and the second position (FIG. 2) when the piston 21 has reached the left end of the cylinder 20. The piston 21 can thus continue to reciprocate as the selector 28 reverses the flow of the oil. In FIGS. 1 to 4, the actuating means 50 is formed by a mechanical and/or electrical coupling between the piston 21 and the selector 28.

A pilot actuator 31 includes a piston 32, or other pressure-responsive means such as a diaphragm, which is coupled by a rod to move the selector 18. The piston 32 defines two pressure chambers 33 and 34 on its opposite sides, which connect respectively through pipes 35 and 36 with the hydraulic pipes 26 and 27. When the oil pressure from the pump 24 is applied to the right pressure chamber 33, the piston 32 and the selector 18 are shifted to the first position (FIG. 1), and vice versa.

In operation, when the pistons 8 and 21 and the hydraulic selector 28 have their first positions (FIG. 1), assuming that the other selector 18 initially has the second position (shown in FIG. 2) where it blocks the tank outlet 5, the hydraulic supply pressure to the right cylinder chamber 22 initially cannot move the pump piston 8 because the selector 18 substantially blocks the feed fluid flow out of the chamber 40 and from the first pump chamber 10 through the tank 1 to the right chamber 11. The reverse osmosis membrane 2 is highly resistant to the flow of fluid, so that little fluid permeates through the membrane 2 into the chamber 41 at this stage.

This interval or portion of the operation should be extremely short in order to enhance the operating efficiency.

This hydraulic pressure to the pipe 26 and the chamber 22 is simultaneously applied to the pipe 35 and the right chamber 33 of pilot actuator 31, and this pressure shifts the piston 32 and the selector 18 to the first position (FIG. 1), thereby opening the flow passage from the chamber 40 to the chamber 11 and allowing the piston 8 to be moved to the left by the hydraulic pressure in the chamber 22. This causes the feed fluid in the first chamber 10 to flow through the tank 1 into the second chamber 11. During this flow, the fluid in the tank chamber 40 is compressed to a high pressure because of the difference in maximum volumes between the chambers 10 and 11 (due to the rod 9), so that a permeate fluid fraction permeates through the reverse osmosis membrane 2 into the tank chamber 41 and is removed though the pipe 3 in the amount corresponding substantially to the difference in volumes. When the piston 21 reaches the position shown in FIG. 2, the selector 28 is actuated to move to the position shown in FIG. 2.

At this time the pistons 8 and 21 and the hydraulic selector 28 have their second positions shown in FIG. 2, but initially the other selector 18 remains at the first position. The check valve 16 prevents the fluid from flowing from the second pump chamber 11 through the tank 1 and into the first chamber 10, so that the hydraulic pressure supplied by the pump 24 to the left hydraulic cylinder chamber 23 initially cannot move the pistons 21 and 8. Likewise, this hydraulic pressure is simultaneously applied to the left actuator chamber 34 through the pipe 36, which shifts the piston 32 and the selector 18 to the second position so that the piston 8 is able to move. Fluid in the chamber 33 is able to flow out through the pipes 35 and 44 to the reservoir 29. This forces the old concentrate fluid in the second pump chamber 11 to be drained through the pipes 13 and 17, and new feed fluid to be sucked into the chamber 10 through the pipe 14. Thus, the selector 18 is shifted immediately before initiation of each piston stroke.

FIGS. 3–4 show a second embodiment of this invention, wherein a concentrating operation is made during every piston stroke of a reciprocating pump 6a. The pump 6a includes two cylinders 7a and 7b fastened together in series and containing two pistons 8a and 8b, respectively, which are fixed together by a rod 9b extending through a partition 9c between the cylinders 7a and 7b. The second piston 8b is fixed to a rod 9a which extends out of the second cylinder 7b. This piston rod 9a can be reciprocated by a double-acting hydraulic cylinder system 19, which is substantially the same as that shown and described in connection with FIGS. 1–2.

The piston rod 9b is larger in diameter than the rod 9a, so that the cylinders 7a and 7b respectively have chambers 10a and 10b which are larger in cross-sectional areas than the paired smaller chambers 11a and 11b.

The larger chambers 10a and 10b, connect respectively with supply pipes 14a and 14b, which connect with a common feed fluid supply pipe 14, and each of which is provided with a check valve 15a and 15b. These chambers 10a and 10b also connect respectively through pipes 12a, and 12b with the inlet 4 of a reverse osmosis tank 1. Each pipe 12a and 12b is provided with a check valve 16a and 16b respectively.

The smaller chambers 11a and 11b connect respectively through pipes 13a and 13b with a selector 18a which connects through a pipe 42 with the tank outlet 5, and with a concentrate fluid drain pipe 17.

The selector 18a has a first position (shown in FIG. 3) where the smaller chamber 11a of the first cylinder and the tank outlet 5 are in communication and the smaller chamber 11b of the second cylinder and the drain pipe 17 are in communication, and a second position as shown in FIG. 4, where the associated pipes communicate in reverse to the above.

The selector 18a is controlled and actuated by a pilot actuator 31 of the hydraulic system 19 to shift to the first position when hydraulic pressure is applied to the right hydraulic cylinder chamber 22 and the chamber 33, and the second position when hydraulic pressure is applied to the left chamber 23.

Immediately before the hydraulic system 19 is able to move the pump pistons 8a and 8b to the left in FIG. 3, the selector 18a shifts to the first position shown in FIG. 3. This allows the feed fluid in the largest pump chamber 10a to flow out through the check valve 16a, tank 1 and selector 18a left. The fluid in the chamber 11b. flows through the selector 18a to the drain pipe 17 and the chamber 10b to be filled through the pipe 14b.

This action also takes out of the tank 1 through the pipe 3 a permeate fluid fraction in the amount corresponding to the difference in cross-sectional area or maximum volumes between the chambers 10a and 11a, and simultaneously sucks feed fluid into the larger chamber 10b through the check valve 15b, and also drains a concentrate fluid fraction from the smaller chamber 11b through the selector 18a.

Likewise, immediately before the pump pistons 8a and 8b can be moved to the right as seen in FIG. 4 along with the piston 21, the selector 18a shifts to the second position shown in FIG. 4 due to the movement of the selector 28 and the piston 32. This allows the feed fluid in the larger pump chamber 10b to flow out through the check valve 16b, the tank 1 and the selector 18a into the smaller chamber 11b, so that the pistons 8a and 8b move to the right.

This takes out of tank 1 a permeate fluid fraction in the amount corresponding to the difference in cross-sectional area or maximum volumes between the chambers 10b and 11b, and simultaneously sucks feed fluid into the largest chamber 10a, and also drains a concentrate fluid fraction from the smaller chamber 11a.

It will be apparent that there are obvious advantages to the systems according to this invention. The selector 28 is timed to shift accurately adjacent the end of each stroke of the reciprocating pump. This eliminates a volume exchanger as required between the outfeed and return conduits of the aforementioned U.S. Pat. No. 4,432,876. As a result, the size of the apparatus can be reduced without lowering its concentrating capacity.

It is not necessary to slow or temporarily interrupt the pump reciprocation in order that the selector is timed to shift at each end of the pump strokes. As a result, the concentrating capacity is not lowered.

Because the reciprocating pump is driven by a double-acting hydraulic cylinder, there is less wear as compared with the prior art arrangements using a screw shaft and a nut. Also, the hydraulic pump can be driven by a motor rotatable in only one direction, which is durable.

The selector is actuated by hydraulic pressure supplied alternately to the hydraulic cylinder chambers, without the necessity of mechanical or electrical means for interlocking the selector with the reciprocal drive for the reciprocating pump. This simplifies the construction and reduces the size and cost of the apparatus, in combination with the elimination of a volume exchanger as required in the U.S. patent.

What is claimed is:

1. Reverse osmosis apparatus comprising:
   a reciprocating pump including a piston which defines on its opposite sides a first cylinder chamber and a second cylinder chamber, said first chamber having a larger maximum volume than said second chamber,
   means connected with said first chamber for feeding fluid thereto through first one-way flow means for fluid flow to said first chamber,
   a reverse osmosis membrane module including an inlet and an outlet,
   second one-way flow means connecting said first chamber with said inlet for fluid flow to said inlet,
   a selector valve connecting said second chamber with said outlet,
   a concentrated fluid drain conduit means connecting with said selector,
   said selector valve having a first position where said second chamber and said outlet are in communication and said drain conduit means is isolated from said second chamber and said outlet,
   and a second position where said second chamber and said drain conduit means are in communication and said outlet is isolated from said second chamber and said drain conduit means,
   means for providing accurate shifting of a directional control valve at the end of each stroke of a pump piston including
   double-acting hydraulic cylinder including a piston which is coupled to said pump piston and defines two chambers on its opposite sides, said two chambers being adapted to be supplied alternately with hydraulic pressure to reciprocate said pistons, and an actuator responsive to the hydraulic pressure alternately supplied to said hydraulic cylinder chambers so as to shift said selector valve selectively to said first position immediately before said first chamber starts to contract, or to said second position immediately before said first chamber starts to expand.

2. The apparatus of claim 1, further comprising a hydraulic pressure circuit alternately supplying said hydraulic cylinder chambers with hydraulic pressure, said actuator including pressure-responsive means coupled to said selector and defining two pressure chambers on its opposite sides, which connect with said hydraulic pressure circuit, whereby said pressure-responsive means can move in one direction when each of said hydraulic cylinder chamber is supplied with hydraulic pressure.

3. The apparatus of claim 2, wherein said pressure-responsive means is a piston.

4. The apparatus of claim 2, wherein said pressure-responsive means is a diaphragm.

5. The apparatus of claim 2, and further including means coupling said hydraulic cylinder with said hydraulic pressure circuit for alternating said hydraulic pressure circuit;

6. Reverse osmosis apparatus comprising:
- a reciprocating pump including two pistons fixed together, one of said pistons defining on its opposite sides first and second cylinder chambers, and the other piston defining on its opposite sides third and fourth cylinder chambers, said first and fourth chambers having larger maximum volumes than said second and third chambers, respectively, said first and third chambers being adapted to expand and contract together while said second and fourth chambers contract and expand together, respectively, feed fluid supply conduit means,
- two feed valves each connecting one of said first and fourth chambers with said supply conduit means for fluid flow to the associated chamber,
- a reverse osmosis membrane module including an inlet and an outlet,
- two check valve means each connecting one of said first and fourth chambers with said inlet for fluid flow to said inlet,
- a selector valve connecting said second and third chambers with said outlet,
- a concentrated fluid drain conduit means connecting with said selector valve,
- said selector valve having a first position where said second chamber and said outlet are in communication and said third chamber and said drain conduit means are in communication, and a second position where said second chamber and said drain conduit means are in communication and said third chamber and said outlet are in communication,
- means for providing accurate shifting of a directional control valve at the end of each stroke of a pump piston including
- a double-acting hydraulic cylinder including a piston which is coupled to said pump pistons and defines two chambers on its opposite sides, said two chambers being adapted to be supplied alternately with hydraulic pressure to reciprocate said pistons, and an actuator responsive to the hydraulic pressure alternately supplied to said hydraulic cylinder chambers so as to shift said selector valve selectively to said first position immediately before said first and third chambers start to contract, or to said second position immediately before said first and third chambers start to expand.

* * * * *